US008040825B2

(12) United States Patent
Park

(10) Patent No.: US 8,040,825 B2
(45) Date of Patent: Oct. 18, 2011

(54) MULTIPARTY CALLING METHOD AND CORRESPONDING MOBILE COMMUNICATION TERMINAL

(75) Inventor: Hee-La Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1398 days.

(21) Appl. No.: 11/254,692

(22) Filed: Oct. 21, 2005

(65) Prior Publication Data

US 2006/0098595 A1  May 11, 2006

(30) Foreign Application Priority Data

Oct. 26, 2004 (KR) ........................ 10-2004-0085928

(51) Int. Cl.
*H04Q 7/00* (2006.01)
*H04Q 7/28* (2006.01)

(52) U.S. Cl. ........ 370/260; 370/261; 370/263; 370/265; 370/266; 370/267; 379/202.01; 379/203.01; 379/204.01; 379/205.01; 379/206.01; 379/207.01; 379/207.02; 379/158; 709/204

(58) Field of Classification Search .......... 370/260–265, 370/266, 267; 379/202.02, 203.01, 204.01, 379/205.01, 206.01, 207.01, 207.02, 158; 709/204
See application file for complete search history.

(56) References Cited

U.S. PATENT DOCUMENTS

| 5,995,825 A | 11/1999 | Hietalahti et al. | |
| 6,574,470 B1 * | 6/2003 | Chow et al. | 455/417 |
| 6,937,597 B1 * | 8/2005 | Rosenberg et al. | 370/356 |
| 7,110,368 B2 * | 9/2006 | Perry | 370/260 |
| 7,639,791 B2 * | 12/2009 | Hodge | 379/207.01 |
| 2004/0141605 A1 * | 7/2004 | Chen et al. | 379/202.01 |
| 2004/0161093 A1 * | 8/2004 | Cox et al. | 379/218.01 |
| 2004/0234058 A1 * | 11/2004 | Darby et al. | 379/202.01 |
| 2005/0048981 A1 * | 3/2005 | Anupam et al. | 455/445 |
| 2005/0090237 A1 * | 4/2005 | Holt et al. | 455/415 |
| 2005/0117714 A1 * | 6/2005 | Chingon et al. | 379/88.12 |
| 2005/0141462 A1 * | 6/2005 | Aerrabotu et al. | 370/335 |
| 2005/0213740 A1 * | 9/2005 | Williams et al. | 379/211.02 |
| 2006/0067500 A1 * | 3/2006 | Christofferson et al. | 379/202.01 |
| 2007/0037599 A1 * | 2/2007 | Tillet et al. | 455/521 |

OTHER PUBLICATIONS

"Digital Cellular Telecommunications System (Phase 2+) (GSM); Universal Mobile Telecommunications System (UMTS); MultiParty (MPTY) Supplementary Service; Stage 2 (3GPP TS 23.084 version 5.0.0 Release 5); ETSI TS 123 084"; ETSI Standards, European Telecommunications Standards Institute, vol. 3-CN4, No. V500, Jun. 2001.

* cited by examiner

*Primary Examiner* — Joe Cheng
*Assistant Examiner* — Wutchung Chu
(74) *Attorney, Agent, or Firm* — Birch, Stewart, Kolasch & Birch, LLP

(57) ABSTRACT

A multiparty calling method, which includes initiating a multiparty call between at least a first, second and third terminal, and setting a flag in the first terminal to inform a processor of the first terminal to skip a process of closing an existing communication path between the first terminal and the second terminal, when the first terminal is disconnected with the third terminal. Further, the set flag is released when the multiparty call between the at least first, second and third terminals has been established for a predetermined time period. In addition, the first terminal preferably sets the flag when the multiparty call join command is transmitted to the network.

16 Claims, 5 Drawing Sheets

MULTIPARTY CALLING METHOD AND CORRESPONDING MOBILE COMMUNICATION TERMINAL

CROSS-REFERENCE TO A RELATED APPLICATION

This application claims priority to Korean Patent Application No. 10-2004-0085928 filed on Oct. 26, 2004 in Korea, the entire contents of which is hereby incorporated by reference in its entirety.

BACKGROUND OF THE INVENTION

1. Field of the Invention

The present invention relates to a multiparty calling method and a corresponding mobile communication terminal, and more particularly to a multiparty calling method and corresponding terminal that prevents one party from being disconnected in a multiparty call when another party is disconnected due to a network error, for example.

2. Description of the Related Art

General communication networks, such as the Global System for Mobile Communications (GSM), General Packet Radio Service (GPRS), and Universal Mobile Telecommunications System (UMTS) networks, allow a subscriber to simultaneously talk with a plurality of other people using one call channel via a multiparty call service provided by the corresponding network. The multiparty call service is also referred to as a multiparty call (e.g., MPTY Call) or a conference call.

In more detail, FIG. 1 is a flowchart illustrating a related art multiparty calling method among three users. As shown, a first user is speaking via the terminal with a second user (S110), and a third user calls the first user (S120). The first user then places the second user in a hold or stand-by state (S130), and accepts the call from the third user (S140). The first user can place the second user on hold by pressing, for example, the keys '2+Send' on the terminal. The key sequence '2+Send' is generally used to perform various operations such as Hold and Accept, Hold and Retrieve, etc., and in this example, the command is used to perform the Hold and Accept function.

The first user then sends a multiparty call join command via a facility message to the corresponding network providing the multiparty calling service (S150), and receives a facility message (e.g., MPTY OK) indicating the multiparty call join command has been accepted (S160). The facility message is a message including different commands that may be transmitted to and from the network and is defined in the Third Generation Partnership Project (3 GPP) Standard, the entire contents of which is hereby incorporated in its entirety. Upon receiving the multiparty acceptance message, the multiparty call among the first, second and third users is established (S170).

In the related art multiparty call performed as shown in FIG. 1, if the first user receives a disconnection message related to the third user and a sufficient amount of time has passed since the multiparty call was established, the third party call is normally released and the remaining call between the first and second parties is not adversely affected.

However, if the first user receives a disconnection message related to the third user during a shorter predetermined time (e.g, about two seconds) after receiving the MPTY OK facility message, the connection between the first and second users may be closed. The reason this connection may be closed will now be explained with reference to FIG. 2, which is an entity model of a general multiparty call service.

In more detail, if the first user receives a disconnection message 240 within a predetermined time after receiving the facility message (MPTY OK), a call control (CC) entity 200 of the mobile terminal receives both the facility message 230 and the disconnection message 240. The disconnection message includes an exception cause value such as a 'temporary failure' with respect to the call connection between the first and third users.

The facility message 230 is then transferred to a supplementary service (SS) entity 210 to be decoded. Then, the decoded facility message is transferred to an upper entity 220. On the other hand, as shown in FIG. 2, the disconnection message 240 is directly transferred from the CC entity 200 to the upper entity 220. Accordingly, in this instance, the upper entity 220 processes the disconnection message 240 before the MPTY OK facility message 230. As a result, the call connection between the first and third users is disconnected.

Further, after receiving and processing the disconnection message 240, the upper entity 220 generates a tone for a predetermined amount of time to indicate the first and third users are disconnected. After generating the tone, the upper entity 220 transfers a disconnection event to an upper User Interface (UI) level (not shown). In addition, while generating the tone, the upper entity 220 receives and processes the MPTY OK facility message 230. Thus, the standby connection between the first and second users is re-opened and placed in an active state allowing the first and second users to communicate. However, when the tone generation is completed and the disconnection event is transferred to the UI level, the audio path between the first and second users is closed, thereby also disconnecting the first and second users.

SUMMARY OF THE INVENTION

Accordingly, an object of the present invention is to address the above-noted and other problems.

Another object of the present invention is to provide a novel multiparty calling method and corresponding mobile terminal, which prevents undesired disconnections between parties using the multiparty call service.

To achieve these and other advantages and in accordance with the purpose of the present invention, as embodied and broadly described herein, the present invention provides a novel multiparty calling method, which includes according to an aspect of the invention initiating a multiparty call process between at least a first, second and third terminal, and setting a flag in the first terminal to inform a processor of the first terminal to skip a process of closing an existing communication path between the first terminal and the second terminal, when the first terminal is disconnected with the third terminal. Further, the set flag is released when the multiparty call between the at least first, second and third terminals has been established for a predetermined time period. In addition, the first terminal preferably sets the flag when the multiparty call join command is transmitted to the network.

The present invention also provides according to another aspect of the invention, a communication terminal including a transceiver configured to transmit and/or receive signals with a corresponding network, a processor configured to initiate a multiparty call with at least a first and second other terminal, and a memory configured to store a flag that is set to inform the processor to skip a process of closing an existing communication path between the communication terminal and the first other terminal, when the communication terminal is disconnected with the second other terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE PREFERRED EMBODIMENTS

Reference will now be made in detail to the preferred embodiments of the present invention, examples of which are illustrated in the accompanying drawings.

Figure 3:
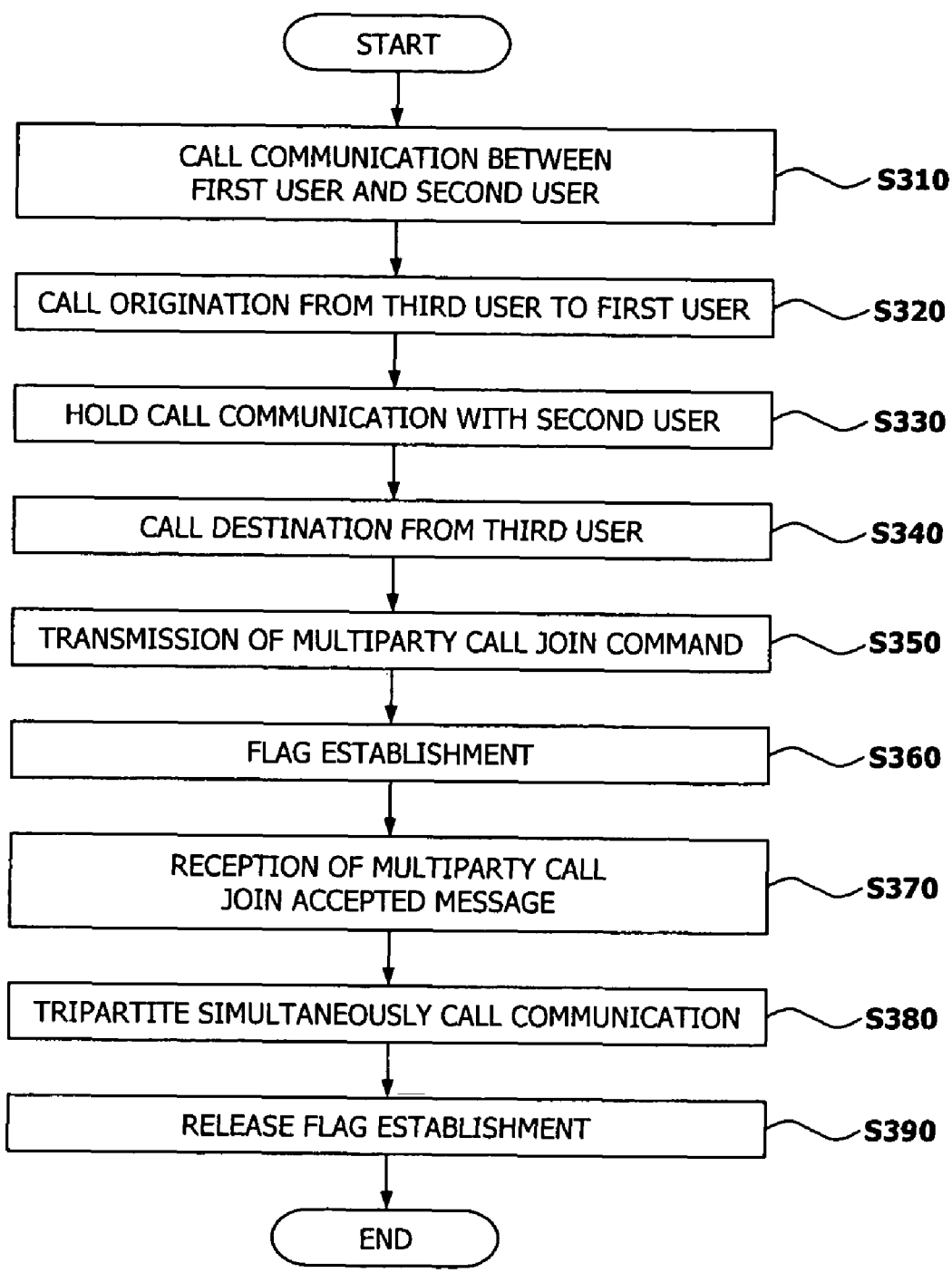
FIG. 3 is a flowchart illustrating a multiparty calling method according to the present invention.

FIG. 3 is a flowchart illustrating a multiparty calling method according to the present invention. As shown, while the first and second users are communicating (S310), a third user calls the first user (S320). After being notified about the third user calling, the first user places the second user on hold (S330). The first user then accepts the call from the third user (S340), and sends a multiparty call join command to the network using a facility message, for example (S350). Further, when the multiparty call join command is transmitted, a flag is set in the mobile terminal of the first user to thereby skip an audio path closing operation related to the established call with the second user (S360).

Then, when the mobile terminal of the first user receives an MPTY OK facility message from the network indicating the multiparty call join command has been accepted (S370), the multiparty call among the first, second and third users is established (S380). Once the tripartite simultaneous call communication has been established, the set flag is released after a predetermined time elapses (S390).

Figure 4:
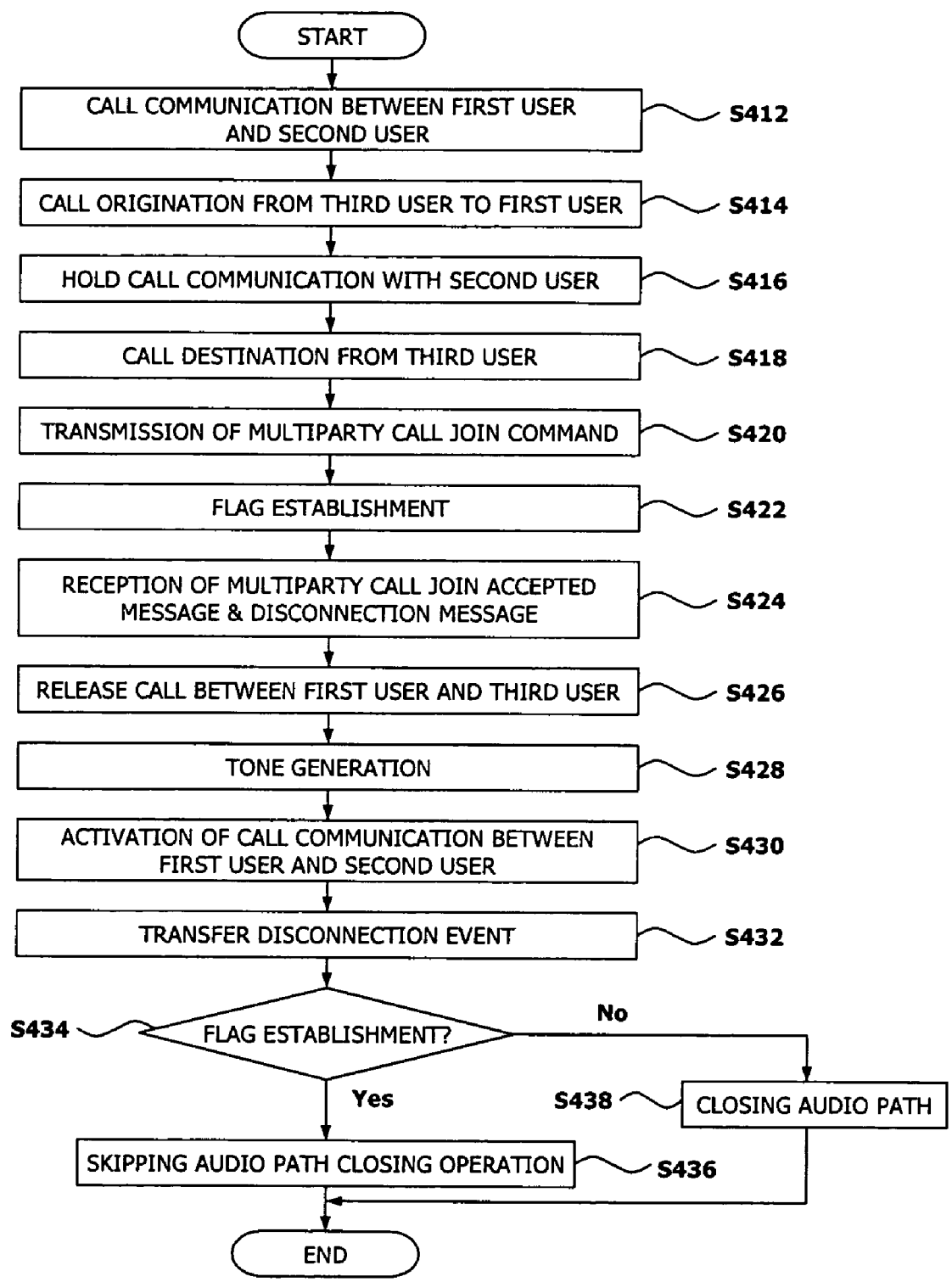
FIG. 4 is a flowchart illustrating a method of skipping an audio path closing operation according to the present invention.

The flag is set in the first user's mobile terminal to skip an audio path closing operation between the first and second users caused by an abnormal disconnection event between the first and third users. In more detail, FIG. 4 is a flowchart illustrating a method for preventing such a disconnection. As discussed above, the disconnection may occur when the mobile terminal of the first user receives a disconnection message within a predetermined time after receiving an MPTY OK facility message.

Referring to FIG. 4, while the first and second users have an established call connection (S412), the third user calls the first user (S414). The first user having received the call from the third user then places the second user on hold (S416), and accepts the call from the third user (S418). The first user then sends a multiparty call join command to the corresponding network using a facility message (S420). Further, when the multiparty call join command is transmitted, a flag is set within the terminal of the first user (S422).

Further, in this example, a disconnection message related to the third user is received within a predetermined time after the first user received the MPTY OK facility message (S424). The disconnection message includes, for example, an exception cause value corresponding to the call connection between the first and third users.

Figure 1:
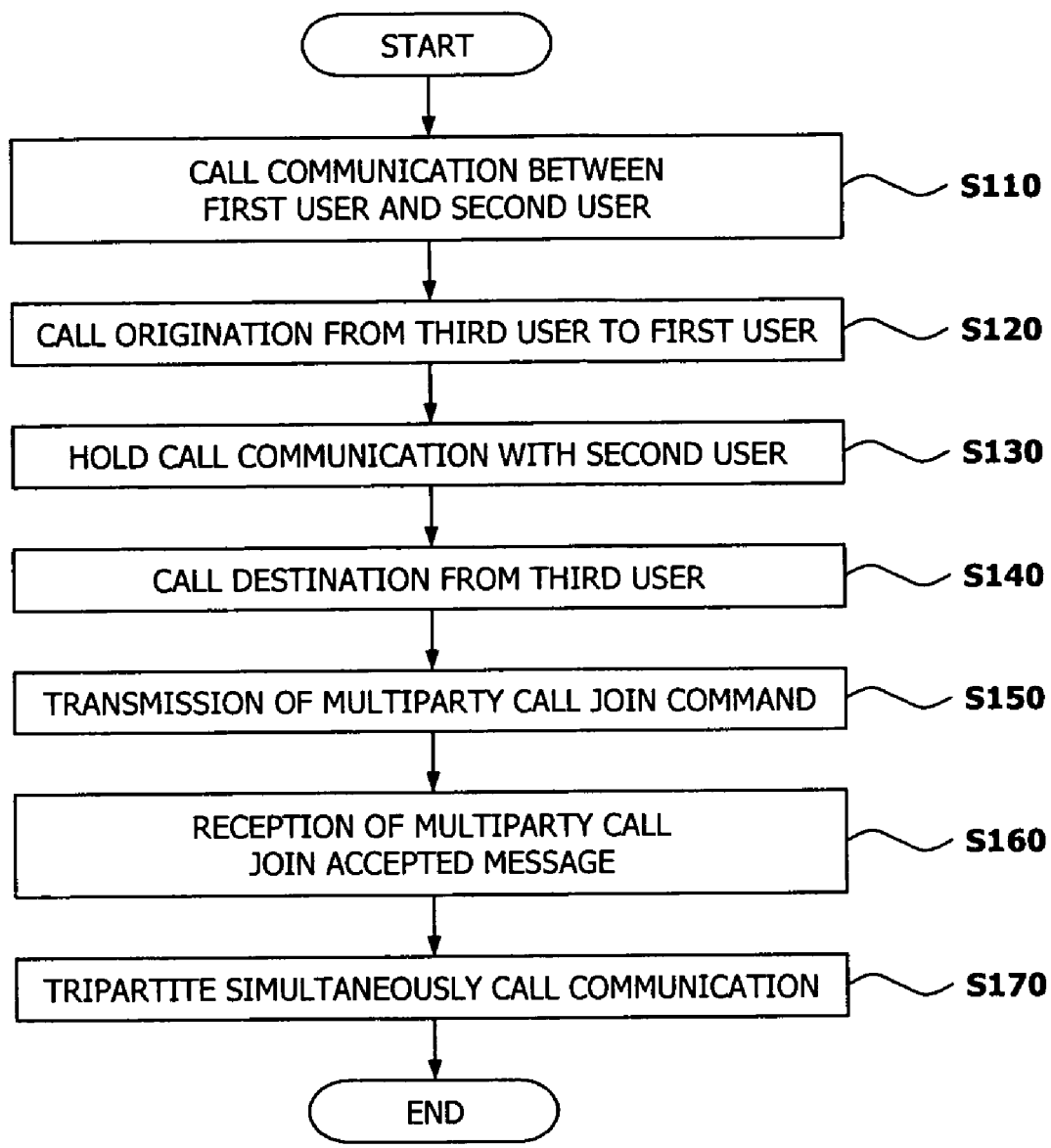
FIG. 1 is a flowchart illustrating a related art multiparty calling method among three parties.
Figure 2:
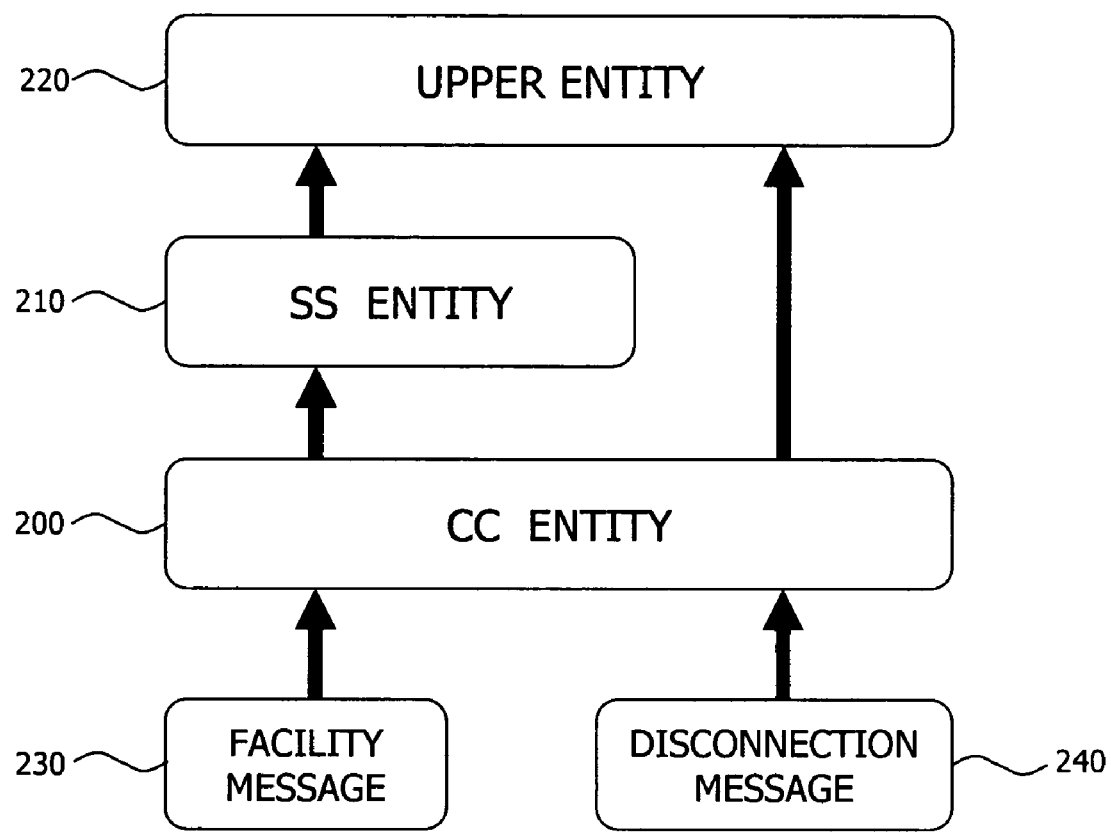
FIG. 2 is a schematic diagram illustrating an entity model of a multiparty call service.

In addition, the upper entity of the mobile terminal of the first user (e.g., the upper entity 220 in FIG. 2) processes the disconnection message before the MPTY OK facility message. As a result, the call connection between the first and third users is released (S426). Further, the upper entity generates a tone for a predetermined amount of time to inform the first user that the third user is disconnected.

The upper entity then processes the multiparty call join request and reopens the held connection between the first and second users to thereby allow communication between the first and second users (S430). Thereafter, when a timer for generating the tone the predetermined amount of time is completed, the upper entity transfers the disconnection event to the UI level (S432).

At this time, the mobile terminal of the first user determines whether or not the flag has been set (S434). When the flag has been set (Yes in S434), the operation for closing the audio path between the first and second users is skipped (S436). However, if the flag is not set (No in S434), the connection between the first and second users is closed (S438). The flag may be a variable that is set to "1" to indicate the closing operation is to be skipped or set to "0" to indicate the closing operation is not to be skipped. Other flag variations may also be used.

Figure 5:
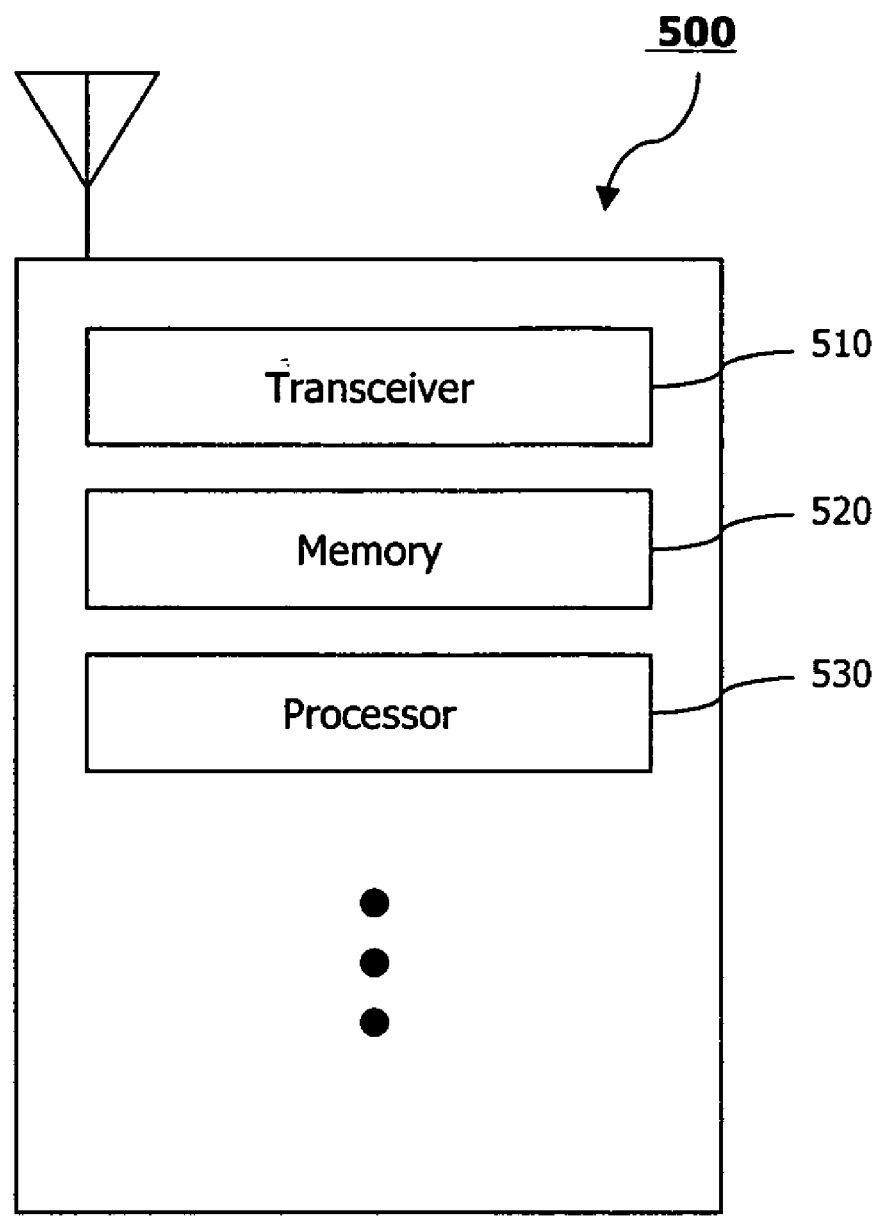
FIG. 5 is an overview of a mobile terminal supporting a multiparty call service according to the present invention.

Turning next to FIG. 5, which is an overview of a mobile terminal supporting a multiparty call method according to the present invention.

As shown, the mobile terminal includes a transceiver 510 for transmitting and receiving signals with a network, a memory 520 for storing information related to the flag setting operation discussed above, and a processor 530 for performing the flag setting operation discussed in FIGS. 3 and 4.

Thus, with reference to FIG. 5, when the processor 530 receives a disconnection message for releasing a call connection with the third mobile terminal within a threshold time period after receiving an MPTY OK facility message, the processor 530 skips releasing the audio path connection between the first and second terminals based on a value of the flag (i.e., whether or not the flag is set).

In more detail, after receiving the disconnection message, a tone is generated for a predetermined amount of time. After the tone is generated, a disconnection event is transferred to a user interface unit (not shown) such as a display device or a speaker. The processor 530 then determines whether the flag has been set. If the processor 530 determines the flag has been set, the processor 530 skips the audio path closing operation between the first and second users. That is, the processor 530 maintains the audio path connection between the first and second users.

Further, the above description referred to three users. However, the number of users may be more than three users.

As described above, in the multiparty calling method and corresponding mobile terminal according to the present invention, when a disconnection message is received within a particular time after receiving the MPTY OK facility message, an audio path of the remaining call is not closed. Further, because the remaining call is not disconnected, radio resources are not wasted.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A multiparty calling method comprising:
   initiating a call process between a first terminal and a second terminal;
   receiving, at the first terminal, an incoming call from at least a third terminal while the call process is being performed between the first and second terminals;
   placing the second terminal on hold and transmitting a multiparty call join command to a corresponding network providing a multiparty call service to request a multiparty call between the first, second and third terminals;
   setting, by the first terminal, a flag in the first terminal to inform a processor of the first terminal to skip a process of closing an existing audio path between the first terminal and the second terminal only when the first terminal receives a disconnection message within a first predetermined time period after receiving a facility OK message from the corresponding network indicating the multiparty call is accepted;
   receiving, at a call control (CC) entity of the first terminal, the facility OK message from the corresponding network indicating the multiparty call is accepted;
   receiving, at the CC entity of the first terminal, the disconnection message from the corresponding network indicating the third terminal has disconnected from the first and second terminals, said disconnection message being received at the CC entity within the first predetermined time period after receiving the facility OK message;
   processing, via first the CC entity, the received facility OK message;
   decoding, via a supplementary service (SS) entity above the CC entity, the received facility OK message;
   processing, via an upper entity above the SS entity, the decoded facility OK message, so as to successfully process the multiparty call between the first, second and third terminals, wherein a second predetermined time period corresponds to an amount of time used to successfully process the multiparty call;
   releasing the connection between the first and third terminals according to the disconnection message; and
   changing a state between the first and second terminals from a hold state into an active state, and skipping the process of closing the audio path between the first and second terminals based on the set flag when the first terminal receives the disconnection message within the first predetermined time period,
   wherein the first predetermined time period is less than the second time predetermined time period.

2. The method of claim 1, further comprising:
   releasing the set flag when the multiparty call between the at least first, second and third terminals has been established for the first predetermined time period.

3. The method of claim 1, wherein the first terminal sets the flag when the multiparty call join command is transmitted to the corresponding network.

4. The method of claim 1, wherein when the third terminal is disconnected from the first terminal, the method further comprises:
   transmitting the disconnection message from the corresponding network to the first terminal to inform the first terminal that the third terminal has been disconnected;
   generating a tone for a predetermined amount of time; and
   providing a disconnection event including the generated tone to a user interface of the first terminal to inform a user of the first terminal that the third terminal has been disconnected.

5. The method of claim 4, further comprising:
   checking, by the first terminal, whether or not the flag is set when the disconnection event is received by the user interface of the first terminal; and
   skipping the process of closing the existing communication path between the first and second terminals when the flag is set.

6. The method of claim 5, further comprising:
   closing the existing communication path between the first and second terminals when the flag is not set.

7. The method of claim 4, wherein the generated tone informs the user of the first terminal the disconnection of the third terminal is caused by a network problem.

8. The method of claim 1, further comprising:
   releasing the connection between the first and third terminals according to the disconnection message if the disconnection message is not received within the first predetermined time period after receiving the facility OK message,
   wherein if the disconnection message is not received within the first predetermined time period, the skipping the process of closing the audio path is not performed.

9. A first terminal comprising:
   a transceiver configured to transmit and/or receive signals with a corresponding network;
   a processor configured to initiate a call the first terminal and a second terminal, to receive an incoming call from at least a third terminal while the call process is being performed between the first and second terminals, to place the second terminal on hold and transmit a multiparty call join command to a corresponding network providing a multiparty call service to request a multiparty call between the first, second and third terminals, to set a flag in the first terminal to inform a processor of the first terminal to skip a process of closing an existing audio path between the first terminal and the second terminal only when the first terminal receives a disconnection message within a first predetermined time period after receiving a facility OK message from the corresponding network indicating the multiparty call is accepted, to receive at a call control (CC) entity of the first terminal the facility OK message from the corresponding network indicating the multiparty call is accepted, to receive, at the CC entity of the first terminal, the disconnection message from the corresponding network indicating the third terminal has disconnected from the first and second terminals, said disconnection message being received at the CC entity within the first predetermined time period after receiving the facility OK message, to process via first the CC entity, the received facility OK message, to decode via a supplementary service (SS) entity above the CC entity, the received facility OK message, to process via an upper entity above the SS entity the decoded facility OK message so as to successfully process the multiparty call between the first, second and third terminals, wherein a second predetermined time period corresponds to amount of time used to successfully process the multiparty call, to release the connection between the first and third terminals according to the disconnection message, and to change a state between the first and second terminals from a hold state into an active state, and skip the process of closing the audio path between the first and second terminals based on the set flag, when the first terminal receives the disconnection message within the first predetermined time period, wherein the first predetermined time period is less than the second time predetermined time period.

10. The terminal of claim 9, wherein the processor releases the set flag when the multiparty call between the communication terminal and the at least first and second other terminals has been established for the first predetermined time period.

11. The terminal of claim 10, wherein the processor sets the flag when the multiparty call join command is transmitted to the corresponding network.

12. The terminal of claim 10, wherein when the second terminal is disconnected from the communication terminal, the transceiver receives the disconnection message from the corresponding network informing the communication terminal that the second other terminal has been disconnected, and the processor generate a tone for a predetermined amount of time and provides a disconnection event including the generated tone to a user interface of the communication terminal to inform a user of the communication terminal that the second other terminal has been disconnected.

13. The terminal of claim 12, wherein the processor checks whether or not the flag is set when the user interface of the first terminal receives the disconnection event and skips the process of closing the existing communication path between the first terminal and the second terminal when the flag is set.

14. The terminal of claim 13, wherein the processor closes the existing communication path between the first terminal and the second terminal when the flag is not set.

15. The terminal of claim 12, wherein the generated tone informs the user of the first terminal the disconnection of the third terminal is caused by a network problem.

16. The mobile terminal of claim 9, wherein the controller is further configured to release the connection between the first and third terminals according to the disconnection message if the disconnection message is not received within the first predetermined time period after receiving the facility OK message, and wherein if the disconnection message is not received within the first predetermined time period, the skipping the process of closing the audio path is not performed.

* * * * *